United States Patent
Lee (10) Patent No.: US 10,420,331 B2
(45) Date of Patent: Sep. 24, 2019

(54) FISHING REEL

(71) Applicant: HAIBAO FISHING TACKLE CO., LTD., Ningbo (CN)

(72) Inventor: Wen-Hsiang Lee, Taichung (TW)

(73) Assignee: HAIBAO FISHING TACKLE CO., LTD., Ningbo (CN)

( * ) Notice: Subject to any disclaimer, the term of this patent is extended or adjusted under 35 U.S.C. 154(b) by 231 days.

(21) Appl. No.: 15/711,320

(22) Filed: Sep. 21, 2017

(65) Prior Publication Data

US 2018/0092342 A1 Apr. 5, 2018

(30) Foreign Application Priority Data

Sep. 30, 2016 (CN) .......................... 2016 1 0866624

(51) Int. Cl.
*A01K 89/01* (2006.01)
*A01K 89/015* (2006.01)

(52) U.S. Cl.
CPC ...... *A01K 89/0184* (2015.05); *A01K 89/0188* (2015.05); *A01K 89/0189* (2015.05); *A01K 89/01931* (2015.05)

(58) Field of Classification Search
CPC ............ A01K 89/0184; A01K 89/0188; A01K 89/01931
See application file for complete search history.

(56) References Cited

U.S. PATENT DOCUMENTS

| 4,966,335 | A | * | 10/1990 | Kaneko | .............. | A01K 89/0184 |
| | | | | | | 242/255 |
| 5,058,447 | A | * | 10/1991 | Ikuta | ....................... | F16H 3/083 |
| | | | | | | 74/371 |
| 5,193,763 | A | * | 3/1993 | Sakaguchi | .......... | A01K 89/0184 |
| | | | | | | 242/255 |
| 5,415,359 | A | * | 5/1995 | Ikuta | .................. | A01K 89/0191 |
| | | | | | | 242/271 |
| 5,560,562 | A | * | 10/1996 | Hartmann | ........ | A01K 89/01909 |
| | | | | | | 242/255 |
| 6,113,019 | A | * | 9/2000 | Jewell | ................. | A01K 89/0184 |
| | | | | | | 242/255 |
| 6,672,526 | B1 | * | 1/2004 | Bledsoe | .............. | A01K 89/0184 |
| | | | | | | 242/255 |
| 7,878,438 | B1 | * | 2/2011 | Ikuta | .................. | A01K 89/0179 |
| | | | | | | 242/306 |
| 8,480,020 | B2 | * | 7/2013 | Ochiai | ................ | A01K 89/0192 |
| | | | | | | 242/274 |
| 2009/0014573 | A1 | * | 1/2009 | Kim | ................... | A01K 89/0184 |
| | | | | | | 242/255 |

(Continued)

*Primary Examiner* — Emmanuel M Marcelo
(74) *Attorney, Agent, or Firm* — Osha Liang LLP (57) ABSTRACT

A fishing reel includes a reel body having a front chamber and a rear chamber, a spool hub rotatably mounted in the rear chamber, a drive shaft having a rear shaft segment rotatably mounted in the front chamber, a drive tube sleeved on the drive shaft to be rotatable relative to the drive shaft, and an output wheel which is sleeved on the drive tube, and which is coupled to drive the spool hub to rotate. When the drive tube is driven to rotate, the output wheel is driven by the drive tube to rotate at a first speed. When the drive shaft is driven to rotate, the drive tube is driven by the drive shaft to rotate via a gear unit, to thereby drive the output wheel to rotate at a second speed different from the first speed.

11 Claims, 10 Drawing Sheets

(56) References Cited

U.S. PATENT DOCUMENTS

| | | | |
|---|---|---|---|
| 2009/0277984 A1* | 11/2009 | Wee | A01K 89/0184 242/257 |
| 2011/0011967 A1* | 1/2011 | Takechi | A01K 89/01908 242/302 |
| 2016/0106082 A1* | 4/2016 | Lee | A01K 89/0105 242/230 |
| 2017/0064934 A1* | 3/2017 | Lee | A01K 89/0184 |

* cited by examiner

FISHING REEL

CROSS-REFERENCE TO RELATED APPLICATION

This application claims priority from Chinese patent application no. 201610866624.0, filed on Sep. 30, 2016.

FIELD

The disclosure relates to a fishing reel, more particularly to a fishing reel with a shifting unit.

BACKGROUND

Figure 1:
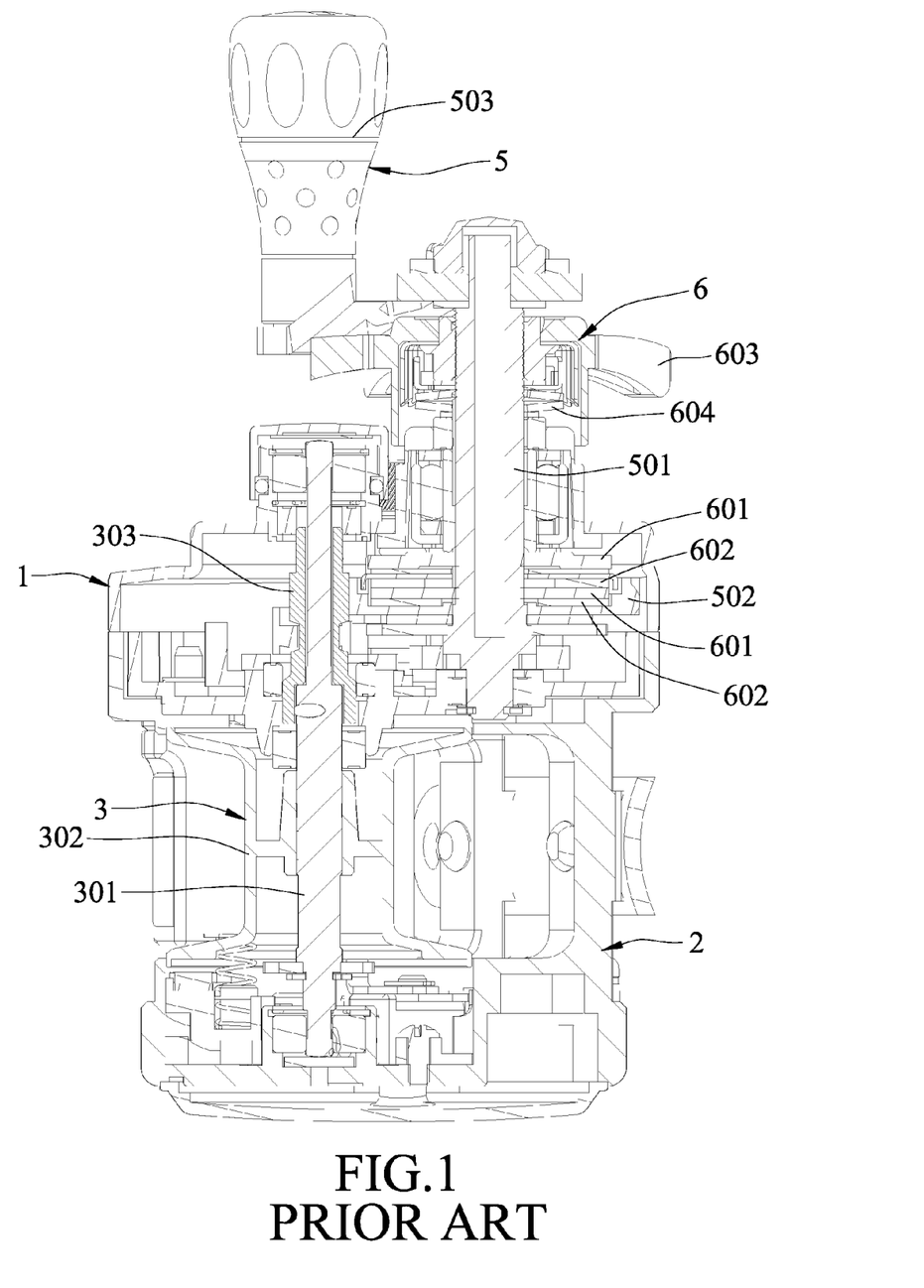
FIG. 1 is a cross-sectional view of a conventional fishing reel.

A conventional dual-bearing fishing reel as shown in FIG. 1 includes a reel body having a front wall 1 and a rear wall 2, a spool unit 3, a fishing line guiding mechanism (not shown), a drive device 5, and a brake unit 6. The spool unit 3 is rotatable relative to the reel body, and includes a spool rod 301, a spool hub 302 configured to permit a fishing line (not shown) to wind thereon, and a coupling sleeve 303 formed with a plurality of engaging teeth. The drive device 5 includes a shaft 501 mounted rotatably relative to the front wall 1, a main gear 502 coupled to rotate with the shaft 501 and configured to mesh with the engaging teeth of the coupling sleeve 303, and a hand-powered crank 503 coupled to drive the shaft 501 to rotate. The brake unit 6 is sleeved on the shaft 501, and includes two pressure discs 601, two friction discs 602, a clamping member 603, and a plurality of disk springs 604.

When the shaft 501 is driven by the hand-powered crank 503 to rotate, the spool unit 3 is driven by the main gear 502 to rotate. At the same time, a camshaft (not shown) of the fishing line guiding mechanism is driven by a secondary gear on the shaft 501 to rotate. In the fishing line guiding mechanism, a camming action between the camshaft and a cam follower of the fishing ling guiding mechanism will cause a linear reciprocating movement of a slider (not shown). The fishing line guided by the slider can be evenly wound on the spool hub 302.

In the above conventional dual-bearing fishing reel, rotational speed of the spool hub 302 cannot be varied.

U.S. Pat. No. 7,878,438 discloses another conventional dual-bearing fishing reel in which rotational speed of a spool hub can be varied by pushing or pulling of an operation shaft.

U.S. Pat. No. 8,480,020 discloses a traverse camshaft of a fishing reel. In addition, as disclosed in US publication nos. 20160106082 and 20170064934, the inventor of this application also proposed an adjusting unit for varying rotation speed of a spool hub.

SUMMARY

Therefore, an object of the disclosure is to provide a novel fishing reel, in which rotational speed of a spool hub can be varied.

According to a first aspect of the disclosure, a fishing reel includes a reel body, a spool unit, a drive shaft, a drive tube, a first drive gear, a second drive gear, an output wheel, a gear unit, a shell body, a crank, and a shifting unit. The reel body includes a forward wall and a rearward wall. The forward and rearward walls are opposite to each other in a longitudinal direction, and define therebetween an accommodation space. The spool unit is rotatably mounted between the forward and rearward walls, and includes a spool rod, and a spool hub coupled to rotate with the spool rod, and a coupling sleeve that is coupled to rotate with the spool rod and that has a pinion portion. The drive shaft extends along a shaft axis in the longitudinal direction, and is rotatably mounted relative to the forward wall about the shaft axis. The drive tube is sleeved on the drive shaft, and is rotatable about the shaft axis relative to the drive shaft. The first drive gear is coupled to rotate with the drive tube. The second drive gear is coupled to rotate with the drive shaft. The output wheel is coupled to be driven by the drive tube to rotate, and has a wheel rim surface with a plurality of wheel teeth that is configured to mesh with the pinion portion so as to drive the spool unit to rotate. The gear unit is coupled to permit rotation transmission between the first drive gear and the second drive gear. The shell body is rotatably mounted on the drive shaft, and has an inner periphery surface defining an inner space. The crank is coupled to drive the shell body to rotate. The shifting unit includes a carrier and a plurality of force transmitting members. The carrier is disposed in the inner space, and includes an annular wall having a plurality of slots. The carrier is shiftable in the longitudinal direction between a first speed position and a second speed position. Each of the force transmitting members is rotatably disposed in a corresponding one of the slots about a rotating axis parallel to the shaft axis such that (i) when the carrier is in the first speed position, the force transmitting members are permitted to transmit rotational force of the shell body to the drive tube, thereby permitting the output wheel to be driven by the drive tube to rotate at a first speed, and (ii) when the carrier is in the second speed position, the force transmitting members are permitted to transmit rotational force of the shell body to the drive shaft, and then to the drive tube via the gear unit, thereby permitting the output wheel to be driven by the drive tube to rotate at a second speed which is different from the first speed.

According to a second aspect of the disclosure, a fishing reel includes a reel body, a spool rod, a spool hub, a drive shaft, a drive tube, a first annular member, a second annular member, a first drive gear, a second drive gear, an output wheel, a coupling sleeve, a clamping nut member, a clamping spring unit, a transmission axle, a front transmission gear, a rear transmission gear, a slider, a cam mechanism, a shell body, a hand-power crank, and a shifting unit. The reel body includes a forward wall, a rearward wall, and an intermediate wall. The forward wall and the rearward wall are opposite to each other in a longitudinal direction, and define therebetween an accommodation space. The intermediate wall is disposed between the forward and rearward walls to divide the accommodation space into a front chamber and a rear chamber. The spool rod extends through the intermediate wall along a spool axis in the longitudinal direction, and includes a front rod segment and a rear rod segment. The front rod segment is disposed in the front chamber, and extends forwardly to terminate at a front rod end which is rotatably mounted on the forward wall. The rear rod segment is disposed in the rear chamber, and extends rearwardly to terminate at a rear rod end which is rotatably mounted on the rearward wall. The spool hub is disposed in the rear chamber, and is mounted on the rear rod segment to rotate with the spool rod. The drive shaft extends along a shaft axis parallel to and offset from the spool axis, and has a front shaft segment, a rear shaft segment, and an intermediate shaft segment. The front shaft segment is disposed forwardly of the forward wall, and extends forwardly to terminate at a front shaft end. The rear shaft segment is disposed in the front chamber, and extends rearwardly to terminate at a rear shaft end rotatably mounted on the intermediate wall. The intermediate shaft segment is disposed between the front and rear shaft segments. The drive tube is sleeved on the intermediate shaft segment, and is rotatable about the shaft axis relative to the drive shaft. The drive tube has a front tube end disposed forwardly of the forward wall, a rear tube end disposed in the front chamber, and a tube body disposed between the front and rear tube ends. The tube body has a male threaded region adjacent to the front tube end. The first annular member has a first rim surface, and is coupled to the front tube end to permit the drive tube to rotate with the first annular member. The second annular member is disposed forwardly of the first annular member, and is coupled to the front shaft end segment to permit the drive shaft to rotate with the second annular member. The second annular member has a second rim surface. The first drive gear is coupled to the rear tube end to rotate with the drive tube about the shaft axis. The first driving gear has a forward surface. The second drive gear is disposed rearwardly of the first drive gear, and is coupled to the rear shaft segment to rotate with the drive shaft about the shaft axis. The output wheel is sleeved on the drive tube, and has a front surface, a rear surface, and a wheel rim surface with a plurality of wheel teeth. The output wheel is movable between a first position, where the rear surface is in loose engagement relative to the forward surface of the first drive gear so as to permit the output wheel to rotate relative to the drive tube, and a second position, where the rear surface is in fully engagement relative to the forward surface of the first drive gear so as to permit the output wheel to rotate with the drive tube. The coupling sleeve is sleeved on the front rod segment to rotate with the spool rod, and has a pinion portion which is configured to be kept in mesh with the wheel teeth when the output wheel is in the first or second position, so as to permit rotation transmission between the spool rod and the output wheel. The clamping nut member is threadedly engaged on the male threaded region of the tube body, and is threadedly movable between a distal position, where the output wheel is in the first position, and a proximate position, where the output wheel is in the second position. The clamping spring unit is disposed between the clamping nut member and the front surface of the output wheel. In response to the movement of the clamping nut member from the distal position to the proximate position, the clamping spring unit is compressed to generate a biasing force to thereby urge the output wheel toward the first drive gear. The transmission axle extends along an axle axis parallel to and offset from the spool axis and the shaft axis, and includes a front axle segment and a rear axle segment. The front axle segment is disposed in the front chamber, and extends forwardly to terminate at a front axle end which is rotatably mounted on the forward wall. The rear axle segment is disposed in the rear chamber, and extends rearwardly to terminate at a rear axle end which is rotatably mounted on the rearward wall. The front transmission gear is coupled to the front axle segment to rotate with the transmission axle about the axle axis, and is configured to mesh with the first drive gear. The rear transmission gear is coupled to the front axle segment to rotate with the transmission axle about the axle axis, and is configured to mesh with the second drive gear. The slider is disposed outboard of the spool hub, and includes a guided segment and a fishing line guiding segment. The guided segment is mounted to be slidable relative to the rear axle segment along the axle axis. The fishing line guiding segment is configured to guide a fishing line so as to permit the fishing line to be wound on the spool hub through the fishing line guiding segment when the spool hub is driven to rotate about the spool axis. The cam mechanism is disposed to couple the rear axle segment with the guided segment of the slider, and includes an endless spiral cam groove formed on the rear axle segment, and a cam follower. The cam follower is disposed on the guided segment, and extends to terminate at a pin end which is configured to be slidably engaged in the endless spiral cam groove such that while the spool hub is driven to rotate about the spool axis, rotation of the transmission axle is permitted to be translated into linear reciprocating motion of the slider along the axle axis, thereby allowing the fishing line to be evenly wound on the spool hub. The shell body is rotatably mounted on the front shaft end of the drive shaft about the shaft axis, and has an inner periphery surface that defines an inner space. The inner periphery surface has a larger dimension region, a smaller dimension region, and a shoulder which is defined between the larger and smaller dimension regions. The hand-powered crank is coupled to the shell body so as to permit the shell body to be driven to rotate about the shaft axis. The shifting unit includes a carrier, a plurality of force transmitting members, and a plurality of biasing members. The carrier is disposed in the inner space to be surrounded by the larger dimension region, and includes an annular wall having an outer wall surface, an inner wall surface, and a plurality of slots that respectively extend through the outer and inner wall surfaces, and that are angularly displaced from each other about the shaft axis. The carrier is shiftable in the longitudinal direction between a first speed position, where the annular wall is disposed between the first rim surface of the first annular member and the larger dimension region, and a second speed position, where the annular wall is disposed between the second rim surface of the second annular member and the larger dimension region. Each of the force transmitting members each is rotatably disposed in a corresponding one of the slots about a rotating axis parallel to the shaft axis. Each of the biasing members each is disposed in a corresponding one of the slots to bias a corresponding one of the force transmitting members to be in frictional engagement with the larger dimension region such that the force transmitting members are permitted to transmit rotational force of the shell body to the first rim surface of the first annular member when the carrier is in the first speed position, and such that the force transmitting members are permitted to transmit the rotational force of the shell body to the second rim surface of the second annular member when the carrier is in the second speed position.

BRIEF DESCRIPTION OF THE DRAWINGS

Other features and advantages of the disclosure will become apparent in the following detailed description of the embodiment with reference to the accompanying drawings, in which.

DETAILED DESCRIPTION

Figure 2:
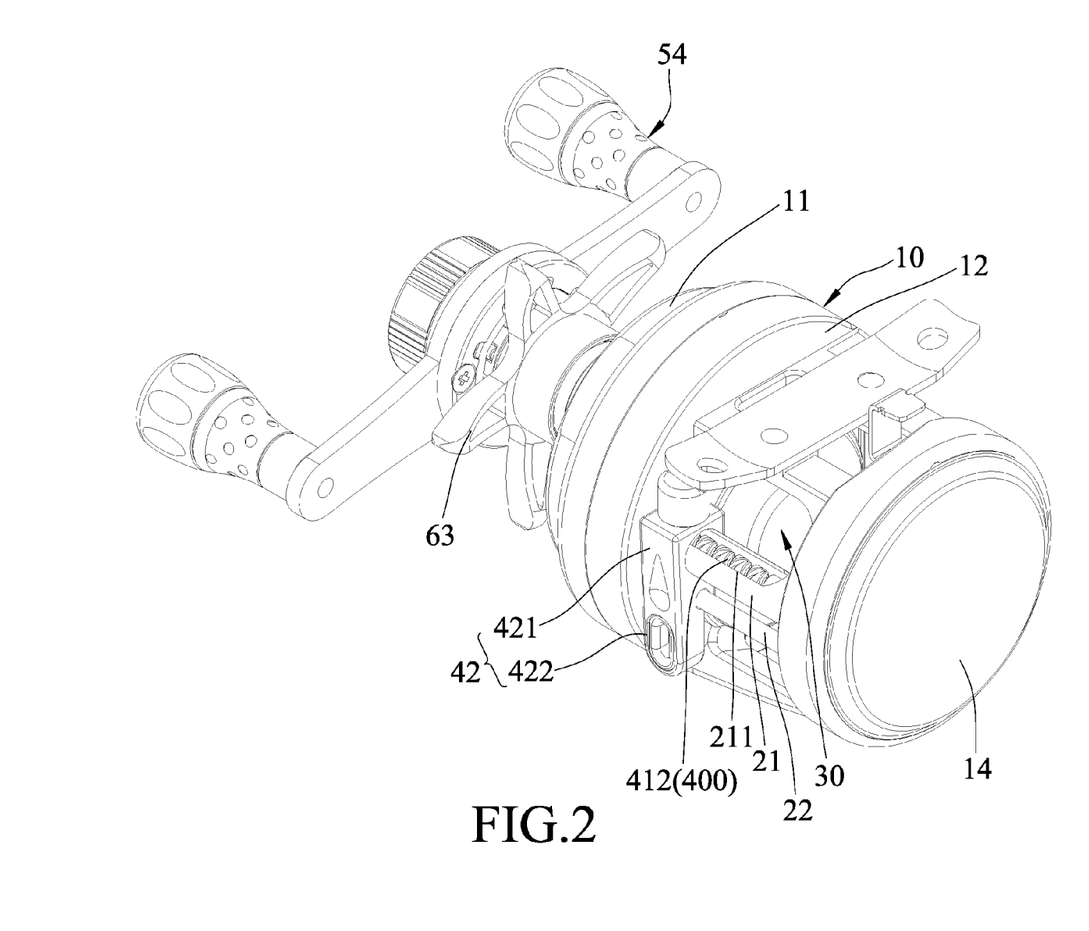
FIG. 2 is a perspective view of a fishing reel according to an embodiment of the disclosure.
Figure 3:
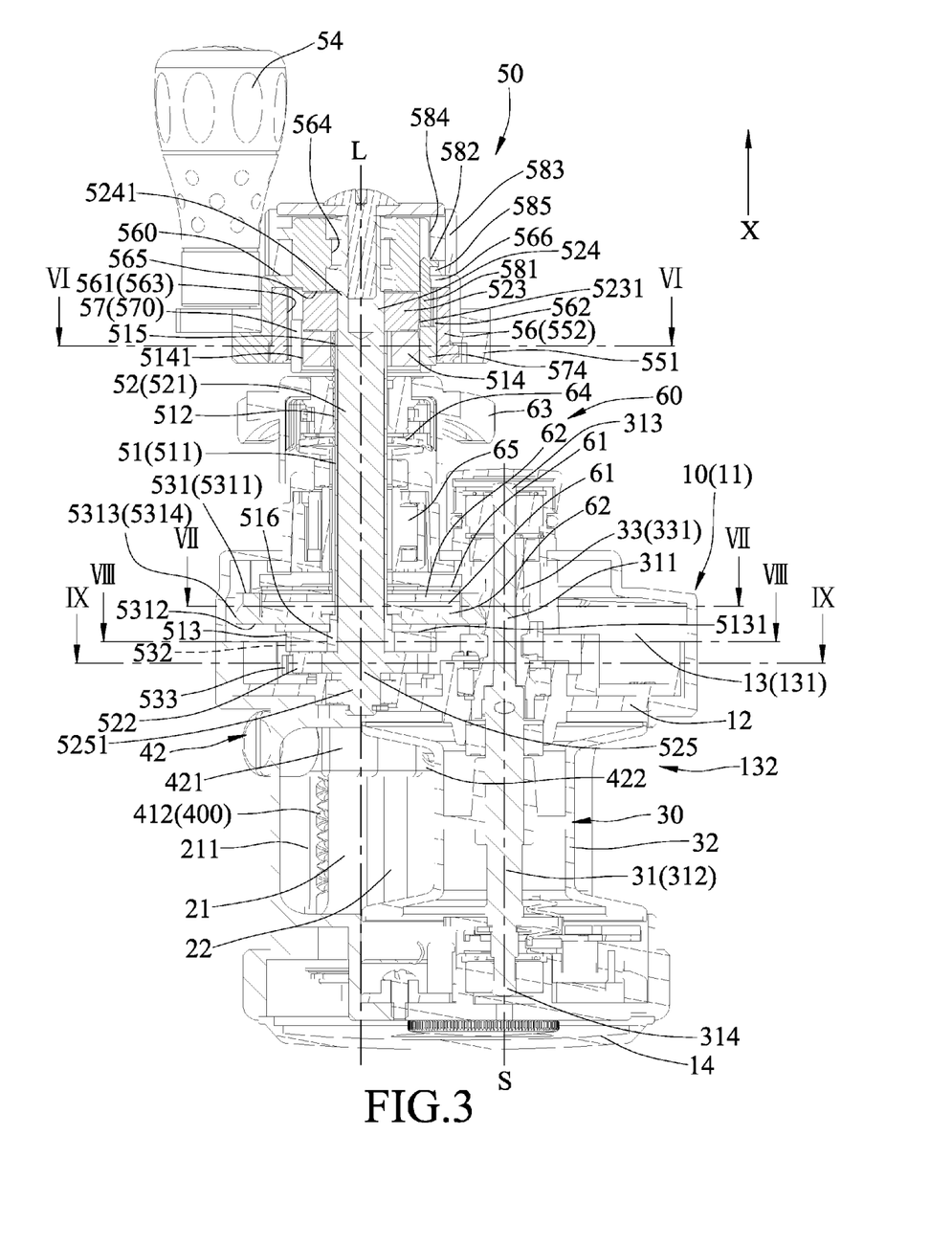
FIG. 3 is a cross-sectional view of the fishing reel shown in FIG. 2.
Figure 4:
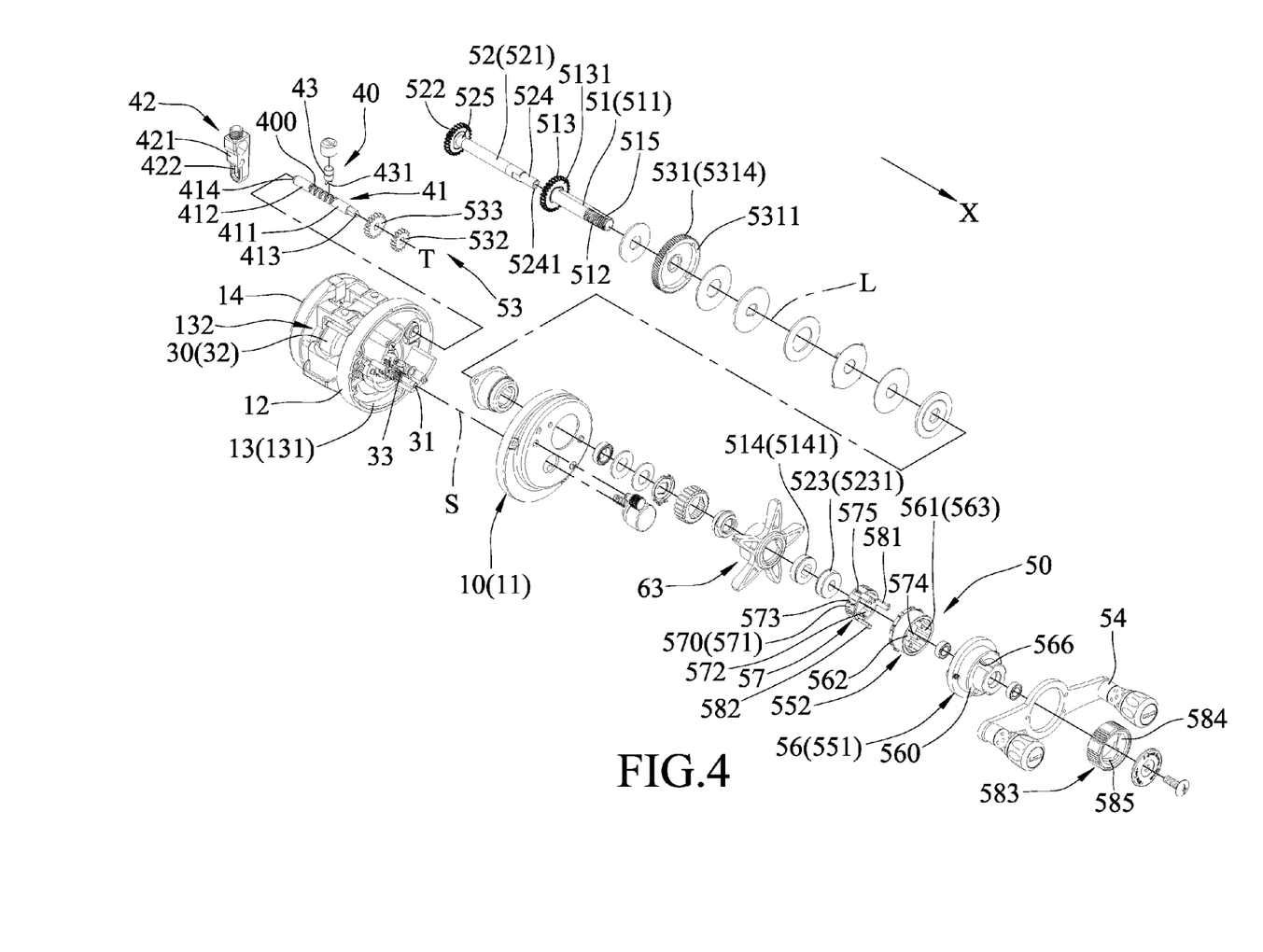
FIG. 4 is an exploded perspective view of the fishing reel shown in FIG. 2 from a front side.

Referring to FIGS. 2 to 4, a fishing reel according to an embodiment of the disclosure is shown to include a reel body 10, a spool unit 30, a drive shaft 52, a drive tube 51, a first drive gear 513, a second drive gear 522, a first annular member 514, a second annular member 523, an output wheel 531, a gear unit 53, a shell body 56, a crank 54, and a shifting unit 50.

The reel body 10 includes a forward wall 11 and a rearward wall 14 which are opposite to each other in a longitudinal direction (X), and which define therebetween an accommodation space 13. In this embodiment, the reel body 10 further includes an intermediate wall 12 disposed between the forward and rearward walls 11, 14 to divide the accommodation space 13 into a front chamber 131 and a rear chamber 132.

The spool unit 30 is rotatably mounted between the forward and rearward walls 11, 14, and includes a spool rod 31, and a spool hub 32 coupled to rotate with the spool rod 31, and a coupling sleeve 33 that is coupled to rotate with the spool rod 31 and that has a pinion portion 331.

In this embodiment, the spool rod 31 extends through the intermediate wall 12 along a spool axis (S) in the longitudinal direction (X), and includes a front rod segment 311 and a rear rod segment 312.

The front rod segment 311 is disposed in the front chamber 131, and extends forwardly to terminate at a front rod end 313 which is rotatably mounted on the forward wall 11. The rear rod segment 312 is disposed in the rear chamber 132, and extends rearwardly to terminate at a rear rod end 314 which is rotatably mounted on the rearward wall 14.

The spool hub 32 is disposed in the rear chamber 132, and is mounted on the rear rod segment 312 to rotate with the spool rod 31.

The coupling sleeve 33 is sleeved on the front rod segment 311 to rotate with the spool rod 31.

The drive shaft 52 extends along a shaft axis (L) parallel to and offset from the spool axis (S), and is rotatably mounted relative to the forward wall 11 about the shaft axis (L). In this embodiment, the drive shaft 52 has a front shaft segment 524, a rear shaft segment 525, and an intermediate shaft segment 521 disposed between the front and rear shaft segments 524, 525.

The front shaft segment 524 is disposed forwardly of the forward wall 11, and extends forwardly to terminate at a front shaft end 5241. The rear shaft segment 525 is disposed in the front chamber 131, and extends rearwardly to terminate at a rear shaft end 5251 which is rotatably mounted on the intermediate wall 12.

The drive tube 51 is sleeved on the drive shaft 52, and is rotatable about the shaft axis (L) relative to the drive shaft 51. In this embodiment, the drive tube 51 is sleeved on the intermediate shaft segment 521, and has a front tube end 515 disposed forwardly of the forward wall 11, a rear tube end 516 disposed in the front chamber 131, and a tube body 511 disposed between the front and rear tube ends 515, 516. In addition, the tube body 511 has a male threaded region 512 adjacent to the front tube end 515.

The first drive gear 513 is coupled to rotate with the drive tube 51. In this embodiment, the first drive gear 513 is coupled to the rear tube end 516 to rotate with the drive tube 51 about the shaft axis (L), and has a forward surface 5131.

The second drive gear 522 is coupled to rotate with the drive shaft 52. In this embodiment, the second drive gear 522 is disposed rearwardly of the first drive gear 513, and is coupled to the rear shaft segment 525 to rotate with the drive shaft 52 about the shaft axis (L).

The first annular member 514 is coupled to permit the drive tube 51 to rotate with the first annular member 514. In this embodiment, the first annular member 514 has a first rim surface 5141, and is coupled to the front tube end 515 to permit the drive tube 51 to rotate with the first annular member 514.

The second annular member 523 is disposed forwardly of the first annular member 514, and is coupled to permit the drive shaft 52 to rotate with the second annular member 523. In this embodiment, the second annular member 523 is coupled to the front shaft end segment 524 to permit the drive shaft 52 to rotate with the second annular member 523, and has a second rim surface 5231.

Figure 7:
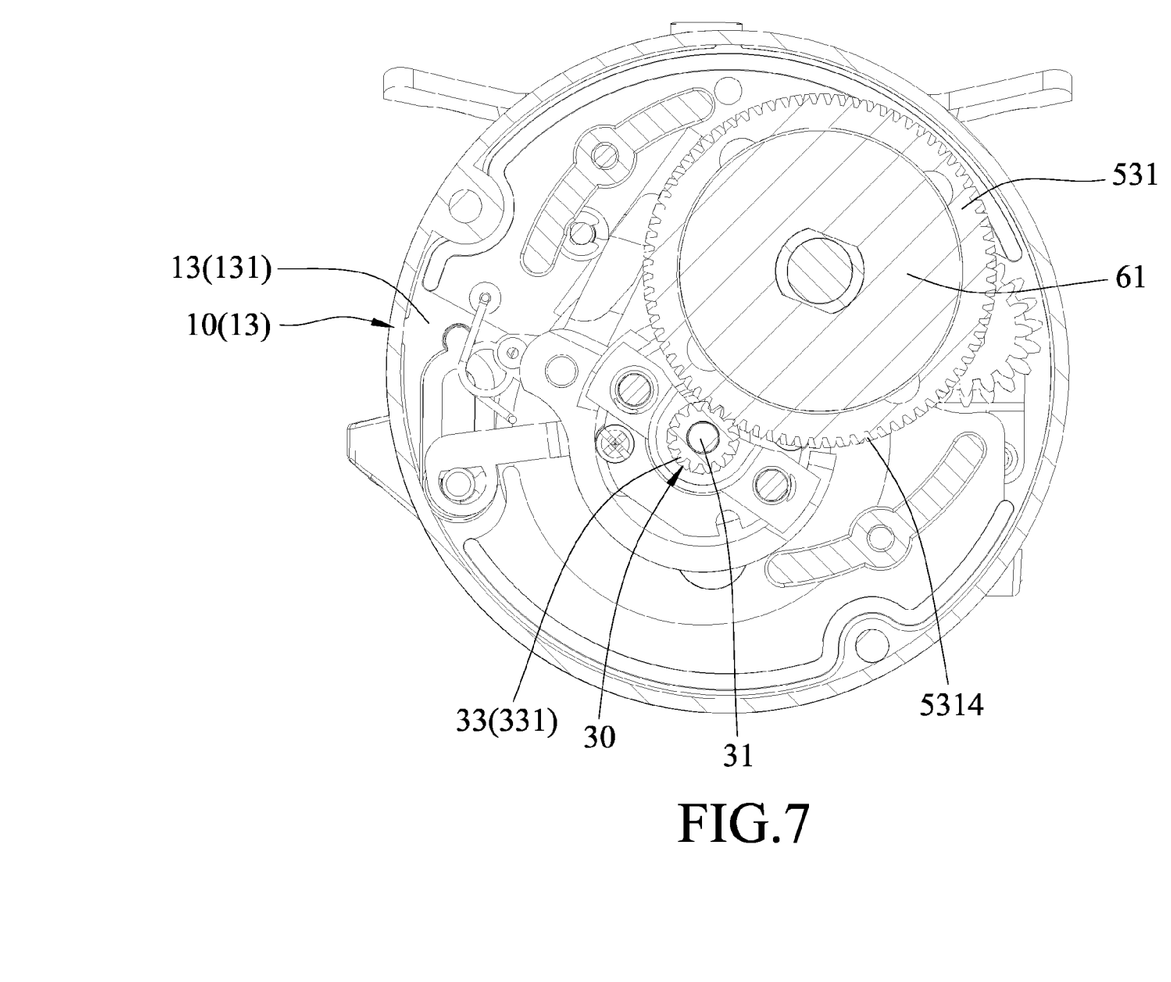
FIG. 7 is a cross-sectional view taken along line VII-VII of FIG. 3.

The output wheel 531 is coupled to be driven by the drive tube 51 to rotate, and has a wheel rim surface 5313 with a plurality of wheel teeth 5314 that is configured to mesh with the pinion portion 331 (see FIG. 7) so as to drive the spool unit 30 to rotate.

In this embodiment, the output wheel 531 is sleeved on the drive tube 51, and has a front surface 5311 and a rear surface 5312. The output wheel 531 is movable between a first position, where the rear surface 5312 is in loose engagement relative to the forward surface 5131 of the first drive gear 513 so as to permit the output wheel 531 to rotate relative to the drive tube 51, and a second position, where the rear surface 5312 is in fully engagement relative to the forward surface 5131 of the first drive gear 513 so as to permit the output wheel 531 to rotate with the drive tube 51. In addition, the pinion portion 331 is configured to be kept in mesh with the wheel teeth 5314 when the output wheel 531 is in the first or second position, so as to permit rotation transmission between the spool rod 31 and the output wheel 531.

As shown in FIGS. 3, 4, 8, and 9, the gear unit 53 is coupled to permit rotation transmission between the first drive gear 513 and the second drive gear 522. In this embodiment, the gear unit 53 includes a transmission axle 41, a front transmission gear 532, and a rear transmission gear 533.

The transmission axle 41 extends along an axle axis (T) parallel to and offset from the spool axis (S) and the shaft axis (L), and includes a front axle segment 411 and a rear axle segment 412. The front axle segment 411 is disposed in the front chamber 131, and extends forwardly to terminate at a front axle end 413 which is rotatably mounted on the forward wall 11. The rear axle segment 412 is disposed in the rear chamber 132, and extends rearwardly to terminate at a rear axle end 414 which is rotatably mounted on the rearward wall 14.

In addition, as best shown in FIG. 2, the rear axle segment 412 is disposed in a tubular member 21 with an opening 211. The tubular member 21 and a guiding rod 22 are each disposed to interconnect the rearward wall 14 and the intermediate wall 12.

Figure 8:
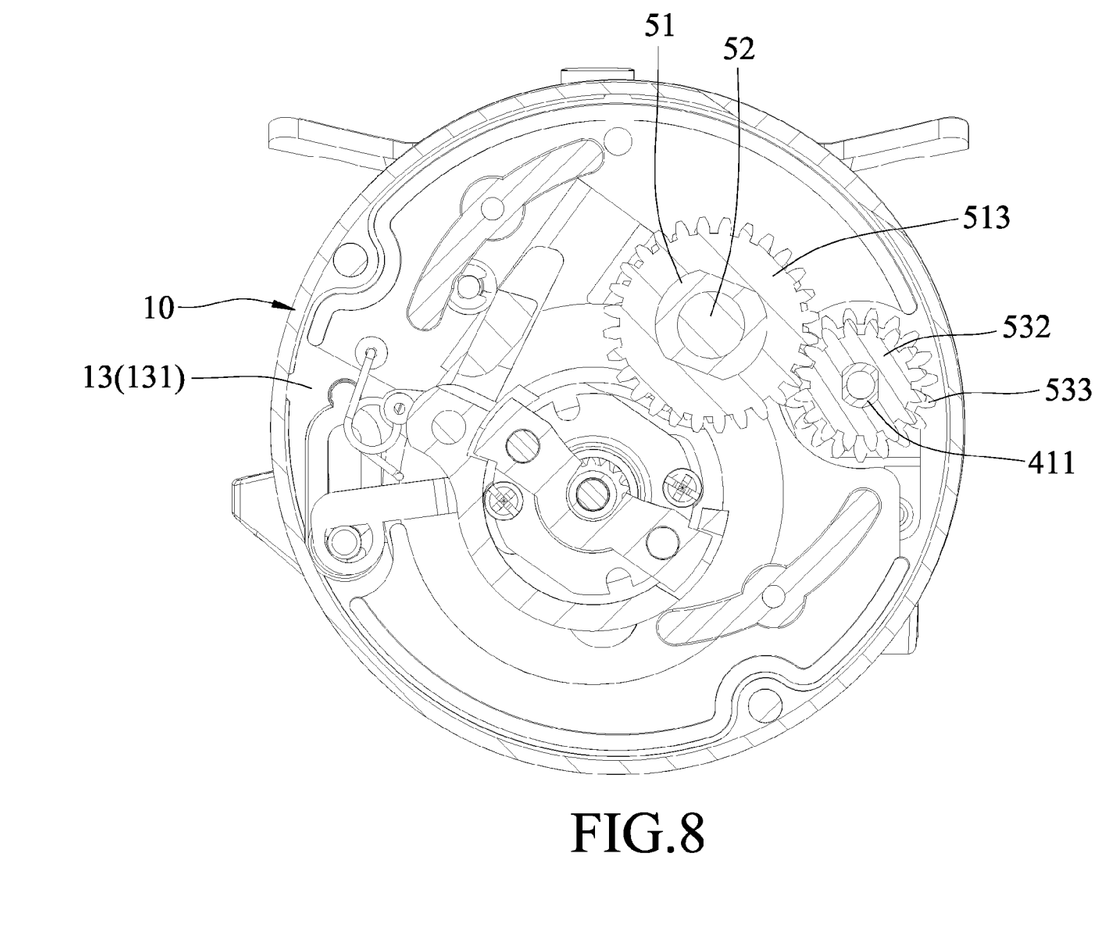
FIG. 8 is a cross-sectional view taken along line VIII-VIII of FIG. 3.

The front transmission gear 532 is coupled to the front axle segment 411 to rotate with the transmission axle 41 about the axle axis (T), and is configured to mesh with the first drive gear 513 (see FIG. 8).

Figure 9:
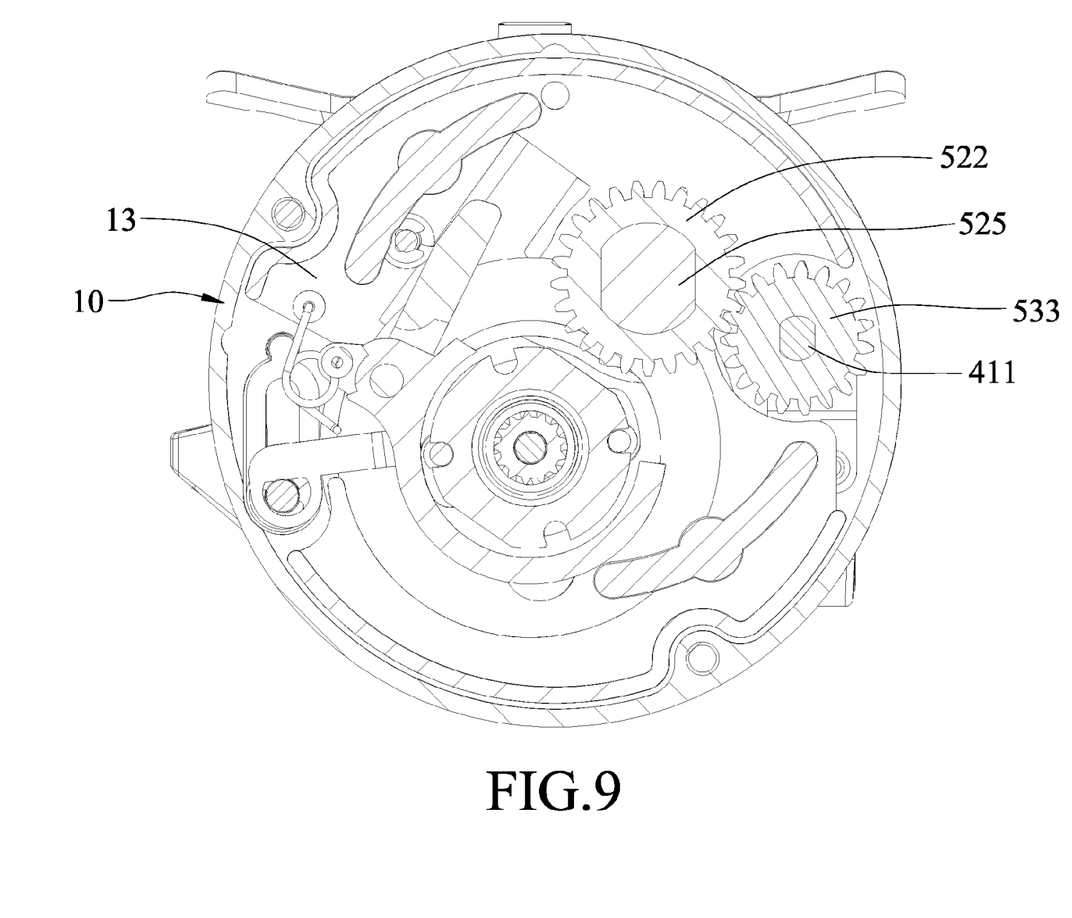
FIG. 9 is a cross-sectional view taken along line IX-IX of FIG. 3.

The rear transmission gear 533 is coupled to the front axle segment 411 to rotate with the transmission axle 41 about the axle axis (T), and is configured to mesh with the second drive gear 522 (see FIG. 9).

The shell body 56 is rotatably mounted on the drive shaft 52, and has an inner periphery surface 561 defining an inner space 562. In this embodiment, the shell body 56 is rotatably mounted on the front shaft end 5241 of the drive shaft 52 about the shaft axis (L), and the inner periphery surface 561 has a larger dimension region 563, a smaller dimension region 564, and a shoulder 565 which is defined between the larger and smaller dimension regions 563, 564. In addition, the shell body 56 has a plurality of through bores 566 which are annularly displaced from each other about the shaft axis (L), and which respectively extend forwardly from the shoulder 565 in the longitudinal direction (X) to an outer surface 560 of the shell body 56.

Furthermore, as shown in FIGS. 3 and 4, the shell body 56 has an outer segment 551 and an inner segment 552. The outer segment 551 has the smaller dimension region 564 and the shoulder 565 of the inner periphery surface 561. The inner segment 552 is fitted inside the outer segment 551, and has the larger dimension region 563 of the inner periphery surface 561.

The crank 54 is coupled to drive the shell body 56 to rotate. In this embodiment, the crank 54 is a hand-powered crank which is coupled to the shell body 56 so as to permit the shell body 56 to be driven to rotate about the shaft axis (L).

Referring to FIG. 4, it can be seen that the shifting unit 50 includes a carrier 57 and a plurality of force transmitting members 574.

The carrier 57 is disposed in the inner space 562, and includes an annular wall 570 having a plurality of slots 573. The carrier 57 is shiftable in the longitudinal direction (X) between a first speed position and a second speed position. In this embodiment, the carrier 57 is disposed to be surrounded by the larger dimension region 563, and the annular wall 570 has an outer wall surface 571, an inner wall surface 572, and the plurality of slots 573 that respectively extend through the outer and inner wall surfaces 571, 572, and that are angularly displaced from each other about the shaft axis (L). When the carrier 57 is in the first speed position (see FIGS. 3 and 6), the annular wall 570 is disposed between the first rim surface 5141 of the first annular member 514 and the larger dimension region 563. When the carrier 57 is in the second speed position (see FIG. 10), the annular wall 570 is disposed between the second rim surface 5231 of the second annular member 523 and the larger dimension region 563.

Figure 6:
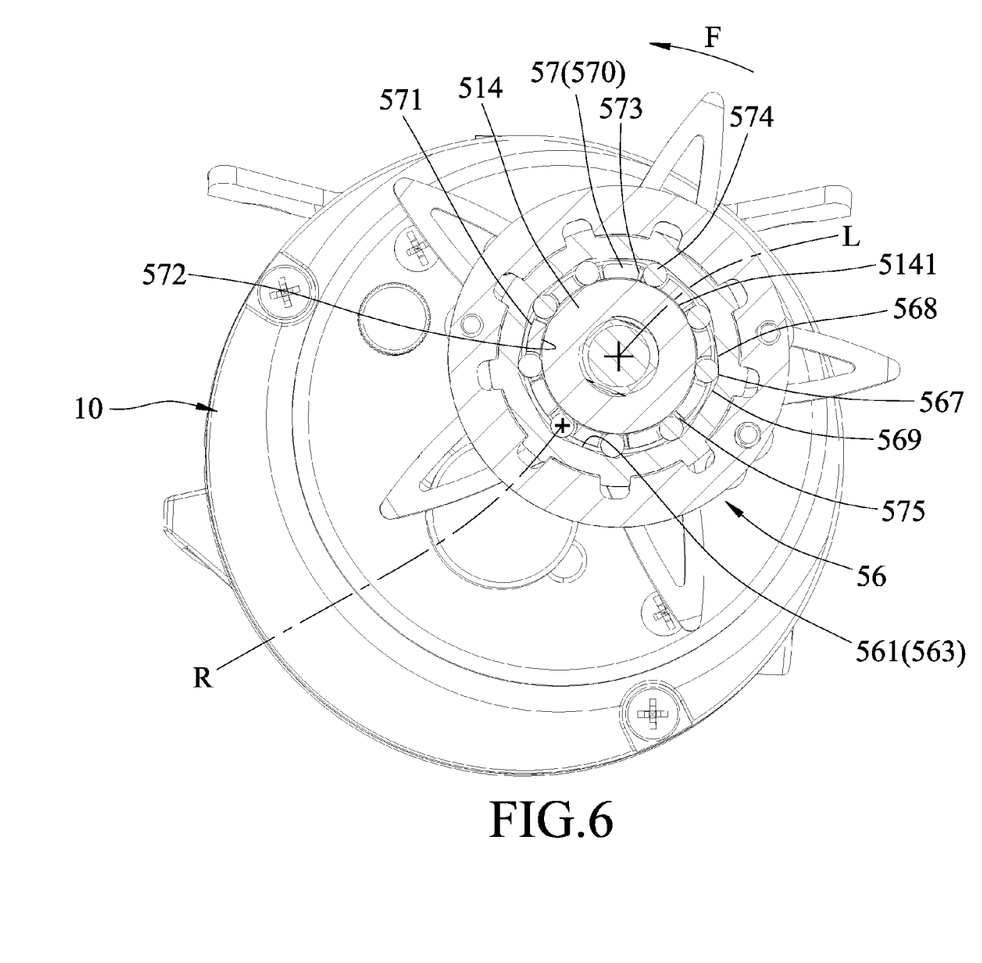
FIG. 6 is a cross-sectional view taken along line VI-VI of FIG. 3.

As shown in FIG. 6, each of the force transmitting members 574 is rotatably disposed in a corresponding one of the slots 573 about a rotating axis (R) parallel to the shaft axis (L) such that: (i) when the carrier 57 is in the first speed position (see FIGS. 3 and 6), the force transmitting members 574 are permitted to transmit rotational force of the shell body 56 to the drive tube 51 through the first annular member 514, thereby permitting the output wheel 531 to be driven by the drive tube 51 to rotate at a first speed; and (ii) when the carrier 57 is in the second speed position, the force transmitting members 574 are permitted to transmit rotational force of the shell body 56 to the drive shaft 52 through the second annular member 523, and then to the drive tube 51 via the gear unit 53, thereby permitting the output wheel 531 to be driven by the drive tube 51 to rotate at a second speed which is different from the first speed. In this embodiment, the first speed is higher than the second speed.

In addition, the larger dimension region 563 has a plurality of frictional areas 567 to correspond to the force transmitting members 574, so as to ensure effective transmission of the rotational force of the shell body 56 to the first annular member 514 or the second annular member 523.

As shown in FIG. 6, the larger dimension region 563 is formed with a plurality of shallow notches 567 serving as the frictional areas 567, respectively. Each of the shallow notches 567 has a ramp-up zone 568 and a ramp-down zone 569. Each of the force transmitting members 574 is urged by a corresponding one of the biasing members 575 to be in frictional engagement with one of the ramp-up and ramp-down zones 568, 569 of a corresponding one of the shallow notches 567. Two adjacent ones of some of the force transmitting members 574 are urged oppositely to be in frictional engagement with the ramp-up zone 569 and ramp-down zone 569 of two corresponding adjacent ones of the shallow notches 567, respectively.

In this embodiment, as shown in FIG. 4, the shifting unit 50 further includes a plurality of biasing members 575, a plurality of follower legs 581, and an annular speed shifter 583.

Figure 10:
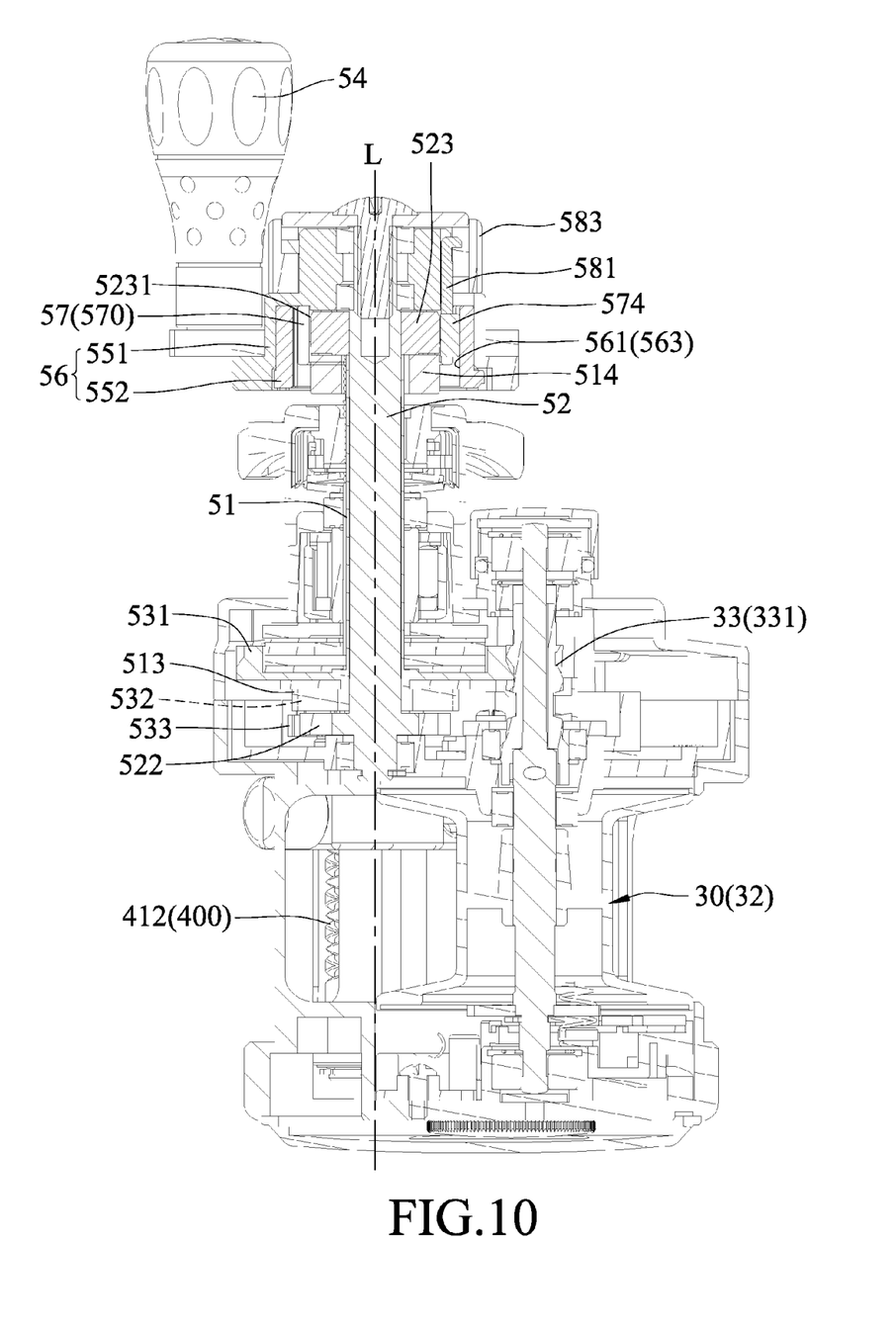
FIG. 10 is a cross-sectional view similar to FIG. 3 but illustrating a carrier in a second speed position.

As shown in FIG. 6, each of the biasing members 575 is disposed in a corresponding one of the slots 573 to bias a corresponding one of the force transmitting members 574 to be in frictional engagement with the larger dimension region 563 such that the force transmitting members 574 are permitted to transmit rotational force of the shell body 56 to the first rim surface 5141 of the first annular member 514 when the carrier 57 is in the first speed position (see FIGS. 3 and 6), and such that the force transmitting members 574 are permitted to transmit the rotational force of the shell body 56 to the second rim surface 5231 of the second annular member 523 when the carrier 57 is in the second speed position (see FIG. 10).

Referring to FIGS. 3 and 4, it can be noted that the follower legs 581 extend forwardly from the annular wall 570 of the carrier 57 respectively through the through bores 566 to permit the carrier 57 to move with the follower legs 581 in the longitudinal direction (X), and have follower ends 582, respectively.

The annular speed shifter 583 is disposed to be rotatable on the outer surface 560 of the shell body 56 about the shaft axis (L), and has an inner peripheral cam surface 584. The inner peripheral cam surface 584 has a plurality of cam grooves 585 each extending about the shaft axis (L) and configured to permit a corresponding one of the follower ends 582 to be engaged therein such that when the annular speed shifter 583 is actuated to rotate, the carrier 57 is permitted to be shifted between the first and second speed positions.

In this embodiment, as shown in FIG. 3, the fishing reel further includes a one-way bearing 65, a clamping nut member 63, and a clamping spring unit 60.

The one-way bearing 65 is disposed between the drive tube 51 and the forward wall 11, and is configured to permit the drive tube 51 to be rotatably mounted relative to the forward wall 11 in a single direction (which is shown by an arrow (F) in FIG. 6) such that when the drive tube 51 is driven to rotate in the single direction to transmit rotational force of the output wheel 531 to the coupling sleeve 33, a fishing line (not shown) is permitted to be wound on the spool hub 32.

Moreover, to cast the fishing line, the output wheel 531 should be moved to the first position to permit the output wheel 531 to rotate relative to the drive tube 51 in a counter direction relative to the single direction, thereby permitting unwinding of the fishing line from the spool hub 32.

When a force exerted by a fish on the fishing reel to unwind the fishing line, the output wheel 531 should be moved to the second position to restrict unwinding of the fishing line from the spool hub 32.

Figure 5:
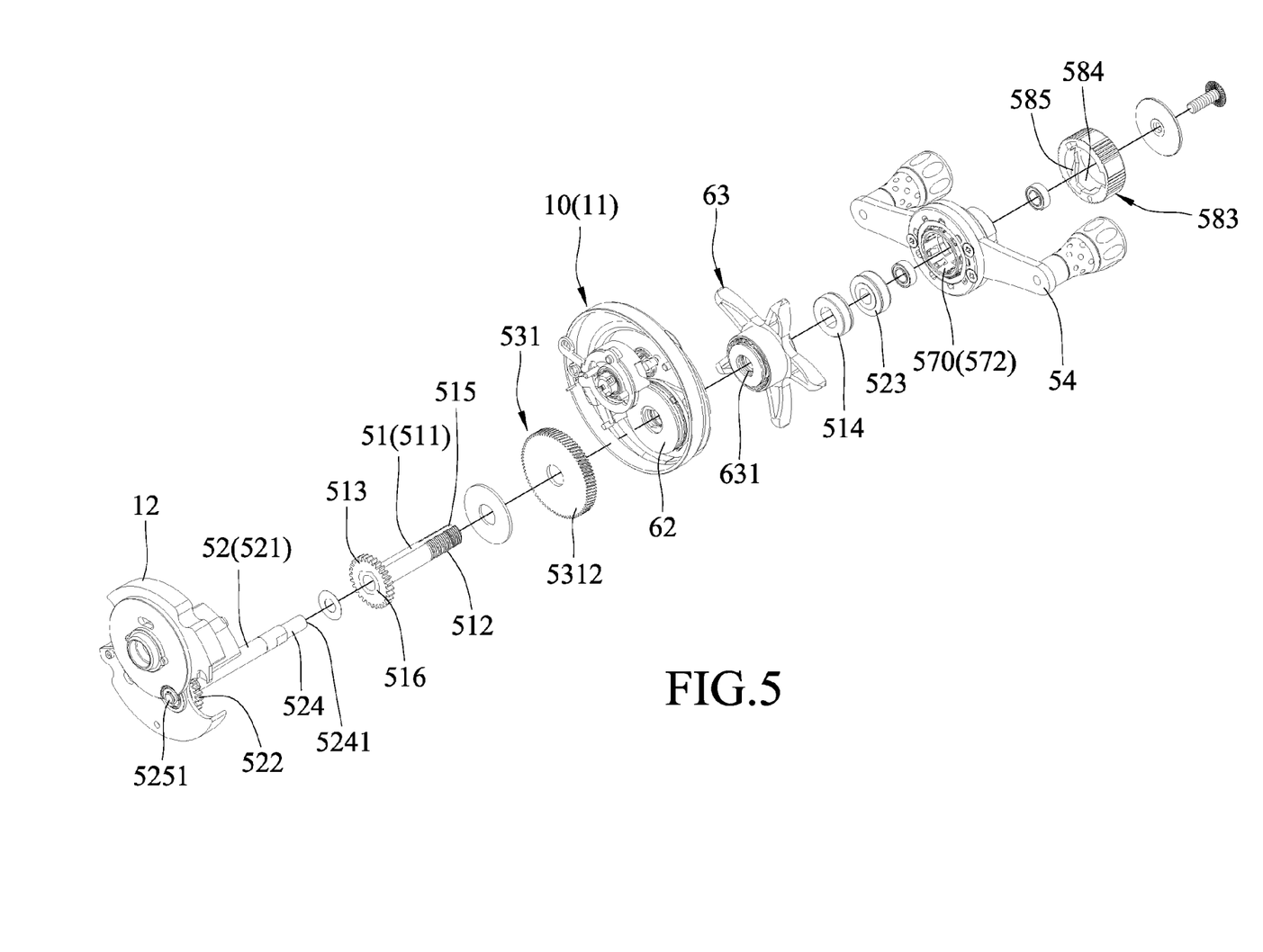
FIG. 5 is a partial exploded perspective view of a part of the fishing reel shown in FIG. 2 from a rear side.

The clamping nut member 63 has a female threaded region 631 (see FIG. 5) which is threadedly engaged on the male threaded region 512 of the tube body 511. The clamping nut member 63 is threadedly movable between a distal position, where the output wheel 531 is in the first position, and a proximate position, where the output wheel 531 is in the second position.

The clamping spring unit 60 is disposed between the clamping nut member 63 and the front surface 5311 of the output wheel 531. In response to the movement of the clamping nut member 63 from the distal position to the proximate position, the clamping spring unit 60 is compressed to generate a biasing force to thereby urge the output wheel 531 toward the first drive gear 513.

As shown in FIG. 3, the clamping spring unit 60 includes a plurality of disc springs 64 disposed forwardly of the one-way bearing 65, and a stack which includes two pressure discs 61 alternating with two friction discs 62, and which is disposed between the one-way bearing 65 and the front surface 5311 of the output wheel 531. In response to the movement of the clamping nut member 63 from the distal position to the proximate position, the clamping spring unit 60, together with the one-way bearing 65, is moved rearwardly to force the output wheel 531 to move to the second position.

Furthermore, in this embodiment, as shown in FIGS. 2 and 4, the fishing reel further includes a slider 42 and a cam mechanism 40.

The slider 42 is disposed outboard of the spool hub 32, and includes a guided segment 421 and a fishing line guiding segment 422.

The guided segment 421 is mounted to be slidable relative to the rear axle segment 412 along the axle axis (T). Referring to FIG. 2, it can be noted that sliding movement of the guided segment 421 is guided by the tubular member 21 and the guiding rod 22.

The fishing line guiding segment 422 is configured to guide a fishing line (not shown) so as to permit the fishing line to be wound on the spool hub 32 through the fishing line guiding segment 422 when the spool hub 32 is driven to rotate about the spool axis (S).

The cam mechanism 40 is disposed to couple the rear axle segment 412 with the guided segment 421 of the slider 42 through the opening 211 of the tubular member 21, and includes an endless spiral cam groove 400 and a cam follower 43.

The endless spiral cam groove 400 is formed on the rear axle segment 412. The cam follower 43 is disposed on the guided segment 421, and extends to terminate at a pin end 431 which is configured to be slidably engaged in the endless spiral cam groove 400 such that while the spool hub 32 is driven to rotate about the spool axis (S), rotation of the transmission axle 41 is permitted to be translated into linear reciprocating motion of the slider 42 along the axle axis (T), thereby allowing the fishing line to be evenly wound on the spool hub 32.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fishing reel comprising:
   a reel body including a forward wall and a rearward wall which are opposite to each other in a longitudinal direction, and which define therebetween an accommodation space;
   a spool unit which is rotatably mounted between said forward and rearward walls, and which includes a spool rod, and a spool hub coupled to rotate with said spool rod, and a coupling sleeve that is coupled to rotate with said spool rod and that has a pinion portion;
   a drive shaft which extends along a shaft axis in the longitudinal direction, and which is rotatably mounted relative to said forward wall about said shaft axis;
   a drive tube which is sleeved on said drive shaft, and which is rotatable about said shaft axis relative to said drive shaft;
   a first drive gear coupled to rotate with said drive tube;
   a second drive gear coupled to rotate with said drive shaft;
   an output wheel which is coupled to be driven by said drive tube to rotate, and which has a wheel rim surface with a plurality of wheel teeth that is configured to mesh with said pinion portion so as to drive said spool unit to rotate;
   a gear unit coupled to permit rotation transmission between said first drive gear and said second drive gear;
   a shell body which is rotatably mounted on said drive shaft, and which has an inner periphery surface defining an inner space;
   a crank coupled to drive said shell body to rotate;
   a shifting unit including
      a carrier which is disposed in said inner space, and which includes an annular wall having a plurality of slots, said carrier being shiftable in the longitudinal direction between a first speed position and a second speed position, and
      a plurality of force transmitting members each being rotatably disposed in a corresponding one of said slots about a rotating axis parallel to said shaft axis such that
         (i) when said carrier is in said first speed position, said force transmitting members are permitted to transmit rotational force of said shell body to said drive tube, thereby permitting said output wheel to be driven by said drive tube to rotate at a first speed, and
         (ii) when said carrier is in said second speed position, said force transmitting members are permitted to transmit rotational force of said shell body to said drive shaft, and then to said drive tube via said gear unit, thereby permitting said output wheel to be driven by said drive tube to rotate at a second speed which is different from said first speed.

2. The fishing reel according to claim 1, further comprising:
a first annular member which is coupled to permit said drive tube to rotate with said first annular member, and which is disposed to permit said force transmitting members to be disposed between said inner periphery surface and said first annular member when said carrier is in said first speed position, so as to allow rotational force of said shell body to be transmitted to said drive tube; and
a second annular member which is coupled to permit said drive shaft to rotate with said second annular member, and which is disposed forwardly of said first annular member to permit said force transmitting members to be disposed between said inner periphery surface and said second annular member when said carrier is in said second speed position, so as to allow rotational force of said shell body to be transmitted to said drive shaft.

3. The fishing reel according to claim 2, wherein:
said reel body further includes an intermediate wall disposed between said forward and rearward walls to divide said accommodation space into a front chamber and a rear chamber;
said spool rod extends through said intermediate wall along a spool axis parallel to and offset from said shaft axis, and includes
a front rod segment disposed in said front chamber, and extending forwardly to terminate at a front rod end which is rotatably mounted on said forward wall, and
a rear rod segment disposed in said rear chamber, and extending rearwardly to terminate at a rear rod end which is rotatably mounted on said rearward wall;
said spool hub is disposed in said rear chamber, and is mounted on said rear rod segment to rotate with said spool rod;
said drive shaft has
a front shaft segment disposed forwardly of said forward wall of said reel body, and extending forwardly to terminate at a front shaft end,
a rear shaft segment which is disposed in said front chamber, and which extends rearwardly to terminate at a rear shaft end rotatably mounted on said intermediate wall, and
an intermediate shaft segment disposed between said front and rear shaft segments;
said drive tube is sleeved on said intermediate shaft segment, and has a front tube end disposed forwardly of said forward wall, a rear tube end disposed in said front chamber, and a tube body disposed between said front and rear tube ends;
said first annular member has a first rim surface, and is coupled to said front tube end to permit said drive tube to rotate with said first annular member;
said second annular member is coupled to said front shaft end segment to permit said drive shaft to rotate with said second annular member, and has a second rim surface;
said first drive gear is coupled to said rear tube end to rotate with said drive tube about said shaft axis, and has a forward surface;
said second drive gear is disposed rearwardly of said first drive gear, and is coupled to said rear shaft segment to rotate with said drive shaft about said shaft axis;
said output wheel is sleeved on said drive tube, and has a front surface and a rear surface, said output wheel being movable between a first position, where said rear surface is in loose engagement relative to said forward surface of said first drive gear so as to permit said output wheel to rotate relative to said drive tube, and a second position, where said rear surface is in fully engagement relative to said forward surface of said first drive gear so as to permit said output wheel to rotate with said drive tube;
said coupling sleeve is sleeved on said front rod segment to rotate with said spool rod, said pinion portion being configured to be kept in mesh with said wheel teeth when said output wheel is in said first or second position, so as to permit rotation transmission between said spool rod and said output wheel;
said shell body is rotatably mounted on said front shaft end of said drive shaft about said shaft axis, said inner periphery surface having a larger dimension region, a smaller dimension region, and a shoulder which is defined between said larger and smaller dimension regions;
said crank is a hand-powered crank coupled to said shell body so as to permit said shell body to be driven to rotate about said shaft axis;
said carrier is disposed to be surrounded by said larger dimension region, said annular wall having an outer wall surface, an inner wall surface, and said plurality of slots that respectively extend through said outer and inner wall surfaces, and that are angularly displaced from each other about said shaft axis, said carrier being shiftable in the longitudinal direction between said first speed position, where said annular wall is disposed between said first rim surface of said first annular member and said larger dimension region, and said second speed position, where said annular wall is disposed between said second rim surface of said second annular member and said larger dimension region;
said shifting unit further includes a plurality of biasing members each being disposed in a corresponding one of said slots to bias a corresponding one of said force transmitting members to be in frictional engagement with said larger dimension region such that said force transmitting members are permitted to transmit rotational force of said shell body to said first rim surface of said first annular member when said carrier is in said first speed position, and such that said force transmitting members are permitted to transmit the rotational force of said shell body to said second rim surface of said second annular member when said carrier is in said second speed position.

4. The fishing reel according to claim 3, wherein said tube body has a male threaded region adjacent to said front tube end, said fishing reel further comprising:
a clamping nut member which is threadedly engaged on said male threaded region of said tube body, and which is threadedly movable between a distal position, where said output wheel is in said first position, and a proximate position, where said output wheel is in said second position; and
a clamping spring unit which is disposed between said clamping nut member and said front surface of said output wheel, and which, in response to the movement of said clamping nut member from said distal position to said proximate position, is compressed to generate a biasing force to thereby urge said output wheel toward said first drive gear.

5. The fishing reel according to claim 3, wherein said gear unit includes:
a transmission axle which extends along an axle axis parallel to and offset from said spool axis and said shaft axis, and which includes
a front axle segment disposed in said front chamber, and extending forwardly to terminate at a front axle end which is rotatably mounted on said forward wall, and
a rear axle segment disposed in said rear chamber, and extending rearwardly to terminate at a rear axle end which is rotatably mounted on said rearward wall;
a front transmission gear which is coupled to said front axle segment to rotate with said transmission axle about said axle axis, and which is configured to mesh with said first drive gear; and
a rear transmission gear which is coupled to said front axle segment to rotate with said transmission axle about said axle axis, and which is configured to mesh with said second drive gear.

6. The fishing reel according to claim 5, further comprising:
a slider disposed outboard of said spool hub, and including
a guided segment which is mounted to be slidable relative to said rear axle segment along the axle axis, and
a fishing line guiding segment which is configured to guide a fishing line so as to permit the fishing line to be wound on said spool hub through said fishing line guiding segment when said spool hub is driven to rotate about said spool axis; and
a cam mechanism which is disposed to couple said rear axle segment with said guided segment of said slider, and which includes
an endless spiral cam groove formed on said rear axle segment, and
a cam follower disposed on said guided segment, and extending to terminate at a pin end which is configured to be slidably engaged in said endless spiral cam groove such that while said spool hub is driven to rotate about said spool axis, rotation of said transmission axle is permitted to be translated into linear reciprocating motion of said slider along said axle axis, thereby allowing the fishing line to be evenly wound on said spool hub.

7. The fishing reel according to claim 3, wherein said larger dimension region has a plurality of frictional areas to correspond to said force transmitting members, so as to ensure effective transmission of the rotational force of said shell body to said first annular member or said second annular member.

8. The fishing reel according to claim 7, wherein said larger dimension region is formed with a plurality of shallow notches serving as said frictional areas, respectively, each of said shallow notches having a ramp-up zone and a ramp-down zone, each of said force transmitting members being urged by a corresponding one of said biasing members to be in frictional engagement with one of said ramp-up and ramp-down zones of a corresponding one of said shallow notches.

9. The fishing reel according to claim 3, wherein said shell body has a plurality of through bores which are annularly displaced from each other about said shaft axis, and which respectively extend forwardly from said shoulder in the longitudinal direction to an outer surface of said shell body, said shifting unit further including
a plurality of follower legs which extend forwardly from said annular wall of said carrier respectively through said through bores to permit said carrier to move with said follower legs in the longitudinal direction, and which respectively have follower ends, and
an annular speed shifter which is disposed to be rotatable on said outer surface of said shell body about said shaft axis, and which has an inner peripheral cam surface, said inner peripheral cam surface having a plurality of cam grooves each extending about said shaft axis and configured to permit a corresponding one of said follower ends to be engaged therein such that when said annular speed shifter is actuated to rotate, said carrier is permitted to be shifted between said first speed position and said second speed position.

10. The fishing reel according to claim 3, further comprising a one-way bearing which is disposed between said drive tube and said forward wall, and which is configured to permit said drive tube to be rotatably mounted relative to said forward wall in a single direction such that when said drive tube is driven to rotate in said single direction to transmit rotational force of said output wheel to said coupling sleeve, a fishing line is permitted to be wound on said spool hub.

11. A fishing reel comprising:
a reel body including
a forward wall and a rearward wall which are opposite to each other in a longitudinal direction, and which define therebetween an accommodation space, and
an intermediate wall disposed between said forward and rearward walls to divide said accommodation space into a front chamber and a rear chamber;
a spool rod which extends through said intermediate wall along a spool axis in the longitudinal direction, and which includes
a front rod segment disposed in said front chamber, and extending forwardly to terminate at a front rod end which is rotatably mounted on said forward wall, and
a rear rod segment disposed in said rear chamber, and extending rearwardly to terminate at a rear rod end which is rotatably mounted on said rearward wall;
a spool hub disposed in said rear chamber, and mounted on said rear rod segment to rotate with said spool rod;
a drive shaft extending along a shaft axis parallel to and offset from said spool axis, and having
a front shaft segment disposed forwardly of said forward wall, and extending forwardly to terminate at a front shaft end,
a rear shaft segment which is disposed in said front chamber, and which extends rearwardly to terminate at a rear shaft end rotatably mounted on said intermediate wall, and
an intermediate shaft segment disposed between said front and rear shaft segments;
a drive tube which is sleeved on said intermediate shaft segment, and which is rotatable about said shaft axis relative to said drive shaft, said drive tube having a front tube end disposed forwardly of said forward wall, a rear tube end disposed in said front chamber, and a tube body disposed between said front and rear tube ends, said tube body having a male threaded region adjacent to said front tube end;

a first annular member which has a first rim surface, and which is coupled to said front tube end to permit said drive tube to rotate with said first annular member;
a second annular member which is disposed forwardly of said first annular member, and which is coupled to said front shaft end segment to permit said drive shaft to rotate with said second annular member, said second annular member having a second rim surface;
a first drive gear coupled to said rear tube end to rotate with said drive tube about said shaft axis, said first driving gear having a forward surface;
a second drive gear disposed rearwardly of said first drive gear, and coupled to said rear shaft segment to rotate with said drive shaft about said shaft axis;
an output wheel sleeved on said drive tube, and having a front surface, a rear surface, and a wheel rim surface with a plurality of wheel teeth, said output wheel being movable between a first position, where said rear surface is in loose engagement relative to said forward surface of said first drive gear so as to permit said output wheel to rotate relative to said drive tube, and a second position, where said rear surface is in fully engagement relative to said forward surface of said first drive gear so as to permit said output wheel to rotate with said drive tube;
a coupling sleeve sleeved on said front rod segment to rotate with said spool rod, and having a pinion portion which is configured to be kept in mesh with said wheel teeth when said output wheel is in said first or second position, so as to permit rotation transmission between said spool rod and said output wheel;
a clamping nut member which is threadedly engaged on said male threaded region of said tube body, and which is threadedly movable between a distal position, where said output wheel is in said first position, and a proximate position, where said output wheel is in said second position;
a clamping spring unit which is disposed between said clamping nut member and said front surface of said output wheel, and which, in response to the movement of said clamping nut member from said distal position to said proximate position, is compressed to generate a biasing force to thereby urge said output wheel toward said first drive gear;
a transmission axle which extends along an axle axis parallel to and offset from said spool axis and said shaft axis, and which includes
 a front axle segment disposed in said front chamber, and extending forwardly to terminate at a front axle end which is rotatably mounted on said forward wall, and
 a rear axle segment disposed in said rear chamber, and extending rearwardly to terminate at a rear axle end which is rotatably mounted on said rearward wall;
a front transmission gear which is coupled to said front axle segment to rotate with said transmission axle about said axle axis, and which is configured to mesh with said first drive gear;
a rear transmission gear which is coupled to said front axle segment to rotate with said transmission axle about said axle axis, and which is configured to mesh with said second drive gear;
a slider disposed outboard of said spool hub, and including
 a guided segment which is mounted to be slidable relative to said rear axle segment along the axle axis, and
 a fishing line guiding segment which is configured to guide a fishing line so as to permit the fishing line to be wound on said spool hub through said fishing line guiding segment when said spool hub is driven to rotate about said spool axis;
a cam mechanism which is disposed to couple said rear axle segment with said guided segment of said slider, and which includes
 an endless spiral cam groove formed on said rear axle segment, and
 a cam follower disposed on said guided segment, and extending to terminate at a pin end which is configured to be slidably engaged in said endless spiral cam groove such that while said spool hub is driven to rotate about said spool axis, rotation of said transmission axle is permitted to be translated into linear reciprocating motion of said slider along said axle axis, thereby allowing the fishing line to be evenly wound on said spool hub;
a shell body which is rotatably mounted on said front shaft end of said drive shaft about said shaft axis, and which has an inner periphery surface that defines an inner space, said inner periphery surface having a larger dimension region, a smaller dimension region, and a shoulder which is defined between said larger and smaller dimension regions;
a hand-powered crank coupled to said shell body so as to permit said shell body to be driven to rotate about said shaft axis; and
a shifting unit including
 a carrier which is disposed in said inner space to be surrounded by said larger dimension region, and which includes an annular wall having an outer wall surface, an inner wall surface, and a plurality of slots that respectively extend through said outer and inner wall surfaces, and that are angularly displaced from each other about said shaft axis, said carrier being shiftable in the longitudinal direction between a first speed position, where said annular wall is disposed between said first rim surface of said first annular member and said larger dimension region, and a second speed position, where said annular wall is disposed between said second rim surface of said second annular member and said larger dimension region,
 a plurality of force transmitting members each being rotatably disposed in a corresponding one of said slots about a rotating axis parallel to said shaft axis, and
 a plurality of biasing members each being disposed in a corresponding one of said slots to bias a corresponding one of said force transmitting members to be in frictional engagement with said larger dimension region such that said force transmitting members are permitted to transmit rotational force of said shell body to said first rim surface of said first annular member when said carrier is in said first speed position, and such that said force transmitting members are permitted to transmit the rotational force of said shell body to said second rim surface of said second annular member when said carrier is in said second speed position.

* * * * *